(12) United States Patent
Stuve

(10) Patent No.: US 7,303,041 B2
(45) Date of Patent: Dec. 4, 2007

(54) VEHICLE SOFT IMPACT DETECTION

(75) Inventor: Steven R. Stuve, Lake Mills, WI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 263 days.

(21) Appl. No.: 11/207,963

(22) Filed: Aug. 22, 2005

(65) Prior Publication Data

US 2007/0039772 A1 Feb. 22, 2007

(51) Int. Cl.
*B60R 21/34* (2006.01)
*B60T 7/22* (2006.01)

(52) U.S. Cl. ............................ 180/274; 280/735

(58) Field of Classification Search ........... 180/271, 180/274; 280/735; 701/45; 340/436; 293/4
See application file for complete search history.

(56) References Cited

U.S. PATENT DOCUMENTS

| | | | |
|---|---|---|---|
| 5,357,232 A * | 10/1994 | Suzuki et al. ............... | 335/215 |
| 5,445,412 A | 8/1995 | Gillis et al. | |
| 5,610,817 A | 3/1997 | Mahon et al. | |
| 5,767,766 A * | 6/1998 | Kwun ....................... | 340/436 |
| 5,797,623 A | 8/1998 | Hubbard | |
| 6,329,910 B1 * | 12/2001 | Farrington ................. | 340/436 |
| 6,559,763 B2 | 5/2003 | Murphy et al. | |
| 6,600,412 B2 | 7/2003 | Ishizaki | |
| 6,737,981 B2 | 5/2004 | Hagemeister | |
| 6,744,354 B2 | 6/2004 | Stephan et al. | |
| 6,746,074 B1 | 6/2004 | Kempf et al. | |
| 6,784,792 B2 * | 8/2004 | Mattes et al. ............... | 340/436 |
| 6,802,556 B2 | 10/2004 | Mattsson et al. | |
| 7,158,017 B2 * | 1/2007 | Baur et al. .................. | 340/436 |
| 7,231,803 B2 * | 6/2007 | Stuetzler .................... | 73/12.01 |
| 2005/0154530 A1 | 7/2005 | Hosokawa et al. | |
| 2006/0131900 A1 * | 6/2006 | Lu et al. ..................... | 293/117 |

FOREIGN PATENT DOCUMENTS

DE 1 032 160 A1 12/2004

OTHER PUBLICATIONS

"Smart fender recognises pedestrian imapct" by Will Knight, NewScientist.com news service, Sep. 11, 2003, http://www.newscientist.com/article.ns?id=dn4157&print=true web page printout (1 p).

"Piezo Sensor Types" MSI Sensors, http://msiusa.com/sensors/piezo_sensor_types.asp Mar. 11, 2005, web page printout (2 pp).

(Continued)

*Primary Examiner*—Eric Culbreth
*Assistant Examiner*—Joseph Rocca
(74) *Attorney, Agent, or Firm*—Lonnie Drayer; Patrick Steinnon

(57) ABSTRACT

A vehicle soft impact detection system uses a piezo film mounted to a front vehicle bumper. The piezo film is selected and mounted to have a greater sensitivity to low-frequency shock waves as compared to high-frequency shock waves, the frequency and amplitude is then compared to a selected range of frequencies and amplitudes that are indicative of a crash with a soft tissue body. In a further embodiment the output of the piezo film is compared with the output of a second sensor which is more sensitive to high-frequency shock waves than to low-frequency shock waves such as a Terfenol-D based sensor.

8 Claims, 3 Drawing Sheets

OTHER PUBLICATIONS

"Piezo Film" MSI Sensors, http://msiusa.com/sensors/piezo_film.asp Mar. 11, 2005, web page printout (2 pp).

Mingfan Li et al., "Giant magetostrictive magnetic fields sensor based on dual fiber Bragg gratings", Networking Sensing and Control, 2005. Proceedings 2005 IEEE Tuscon, AZ, USA Mar. 19-22, 2005. Piscataway, NJ, USA, IEEE Mar. 19, 2005, pp. 490-495, XP010813446 ISBN: 0-7803-8812-7.

* cited by examiner

VEHICLE SOFT IMPACT DETECTION

BACKGROUND OF THE INVENTION

The present invention relates to vehicle crash sensors in general and to sensors which detect a collision with a pedestrian in particular.

Improvements in the structural design of automobiles, combined with passive safety systems such as seat belts, and active safety systems such as air bags and seatbelt retractors, have greatly decreased death and injury to automobile occupants resulting from a car crash. The active safety systems respond to crash sensors that detect the onset of a vehicle crash, and activate or deploy devices to minimize vehicle occupant injury during the crash.

A vehicle collision is not only a hazard to the vehicle occupants, but in the case of a collision with a pedestrian, the pedestrian may be gravely injured or killed. Recently there have been efforts to develop deployable safety systems that are designed to benefit the pedestrian during a vehicle-pedestrian collision. These systems deploy actuators that raise the vehicle hood, or deploy an airbag to reduce injury to the pedestrian's head. Another type of collision that may be relatively benign is a collision with an animal such as a deer. The major hazard of this type of collision is that the animal may ride up over the hood of the vehicle and crash through the front windshield. Active safety systems that respond to the onset of a vehicle-animal collision are being considered.

U.S. Pat. No. 6,784,792 B2 discloses using piezoelectric film sensors to detect pressure and deformation caused by impact with a pedestrian, and comparing the sensor output signals to a reference quantity to derive a first decision criteria, and discloses deriving a second criteria due to the change in velocity or acceleration of the vehicle. Piezoelectric strips have been used to detect the onset of a crash, such as disclosed in U.S. Pat. No. 6,559,763 B2. Measurement of strain energy to detect a side impact using a piezoelectric sensor is disclosed in U.S. Pat. No. 5,797,623.

Using a piezoelectric film to detect accelerations produced by hydraulic percussion devices is known from U.S. Pat. No. 6,737,981 B2. The frequency and amplitude of a magnetorestrictive sensor have been analyzed to determine the position of the crash in the transverse direction along a stress conducting member, as in U.S. Pat. No. 6,329,910 B1.

Both a vehicle-pedestrian collision, and a vehicle-animal collision are similar in that the vehicle impacts with a relatively low mass soft tissue object. Sensors are needed which can differentiate this type of collision from collisions with large massive objects, or collisions with less massive but rigid objects, so that in each case the deployment or non-deployment of active safety systems can be optimized.

SUMMARY OF THE INVENTION

The vehicle soft impact detection system of this invention uses a piezo or piezoelectric film mounted to a front vehicle bumper. Piezo fluoropolymer film (PVDF) is a piezoelectric material that is a relatively new class of piezo-electric sensors. The PVDF material is a thin plastic polymer sheet that has a thin electrically conductive nickel copper alloy deposited on each side. This material is called piezo film. To get an electrical output from a piezo film an electrical connection to the electrically conductive coating on each side of the PVDF material is made. The piezo film of this invention is selected and mounted so as to have a greater sensitivity to low-frequency shock waves as compared to high-frequency shock waves. The frequency and amplitude is then compared to a selected range of frequencies and amplitudes that are indicative of a crash with a soft tissue body. In a further embodiment the output of the piezo film is compared with the output of a second sensor which is more sensitive than piezo film to high-frequency shock waves and less sensitive than piezo film to low-frequency shock waves. The second sensor could be, for example, a Terfenol-D based sensor It is a feature of the present invention to provide an animal or pedestrian impact detection system that can differentiate between impact with an animal or pedestrian and impact with massive or lightweight rigid objects.

It is another feature of the present invention to provide an impact sensor linked to a safety system that is deployed in the event of striking an animal to protect the vehicle occupants.

It is a further feature of the present invention to use multiple sensors to distinguish between an impact with an animal or pedestrian, and impacts with more rigid objects.

Further features and advantages of the invention will be apparent from the following detailed description when taken in conjunction with the accompanying drawings.

DETAILED DESCRIPTION OF THE INVENTION

Figure 1:
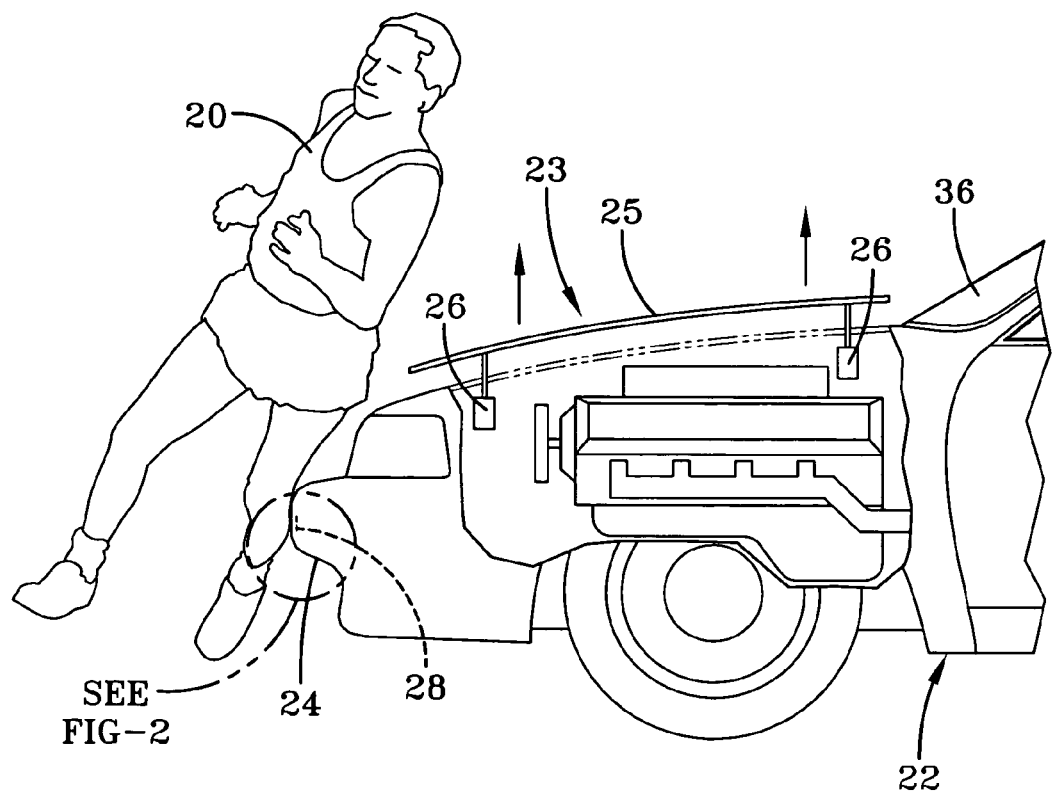
FIG. 1 is a schematic side elevation view, partly cut away, of an automobile equipped with the vehicle soft impact detection system of this invention impacting a pedestrian.

Referring more particularly to FIGS. 1-4, wherein like numbers refer to similar parts, a pedestrian 20 is shown being impacted by an automobile 22 which is equipped with the vehicle soft impact detection system 23 of this invention. In the event of such an impact, the pedestrian 20 normally impacts the bumper 24 first, followed by an impact with the car hood 25. In order to allow timely activation of active devices 26 which form part of a safety system, and which are designed to prevent harm to the pedestrian, sensors are needed which indicate an impact with a pedestrian. The system 23 has a piezo film sensor 28 which can be used to differentiate between pedestrian impacts and other types of impacts. In particular, the piezo film sensor 28 is used to differentiate soft, low mass impacts, from crashes into a barrier or another vehicle, and also is used to differentiate soft low mass impacts from bumper strikes by rocks, ice or other road debris.

Figure 3:
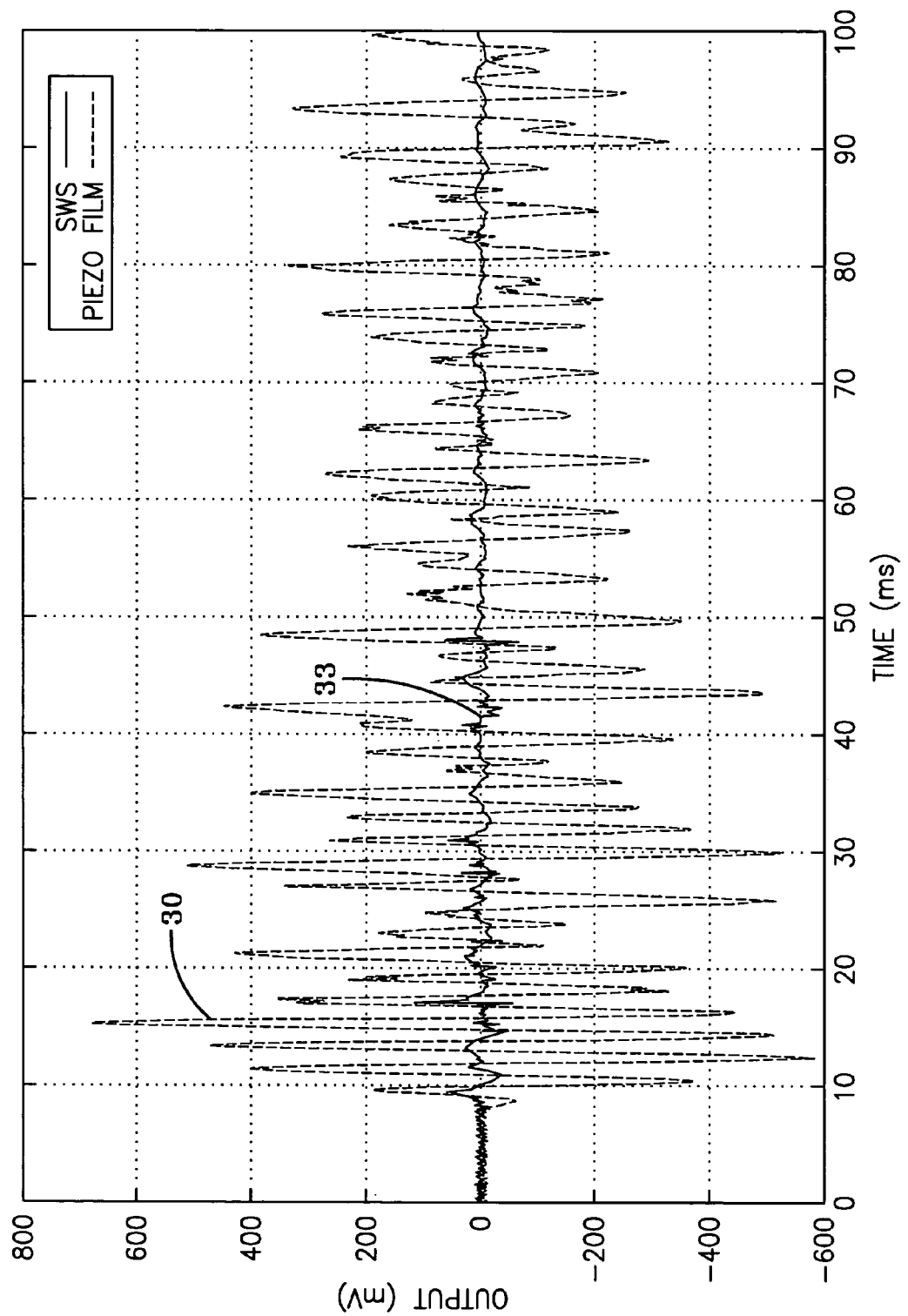
FIG. 3 is a graph of amplitude and time of the output of a piezo film sensor and a Terfenol D sensor mounted to a flat plate and struck by a rubber hammer.
Figure 4:
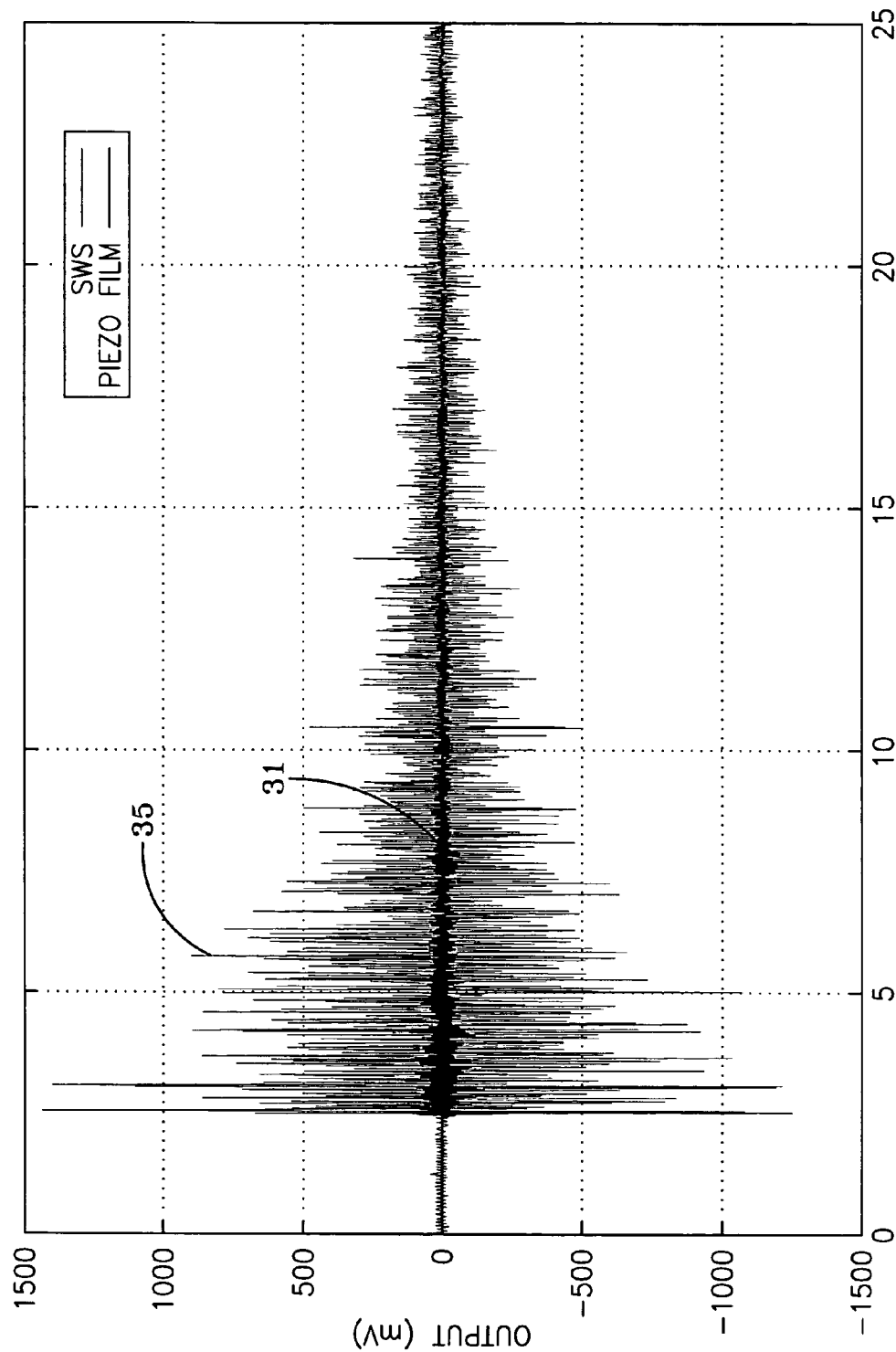
FIG. 4 is a graph of amplitude and time of the output of a piezo film sensor and a Terfenol D sensor mounted to a flat plate struck by a metal ball-bearing.

It has been found experimentally that piezo film sensors are sensitive to low-frequency shock waves, as shown in FIG. 3, where a rubber hammer was used to create stress waves 30 in a metal plate (not shown). The resulting stress waves 30 have a frequency of about 500-600 Hz and an amplitude of between 200 and 600 mV as detected by the piezo film sensor 28. The table of FIG. 4 shows the frequency and amplitude response, i.e. the stress waves 31, of the piezo film sensor 28 responding to a ¼ inch steel ball-bearing dropped onto the metal plate from a height of about 1 m.

The ball bearing produced a frequency of about 22,000 Hz with an amplitude of about 200 mV. By using a ratio between the amplitude of the signal produced by the piezo film sensor 28 at two different frequencies, the impact of a pedestrian or animal can be differentiated from a stone strike, or an impact with a rigid object. For example, the output of the piezo film sensor 28 could be analyzed as a power spectral density function, which could then be correlated with the type of impact. A power spectral density function is defined as the Fourier transform of the autocorrelation sequence of the time series, or the squared modulus of the Fourier transform of the time series, scaled by a proper constant term.

Figure 2:
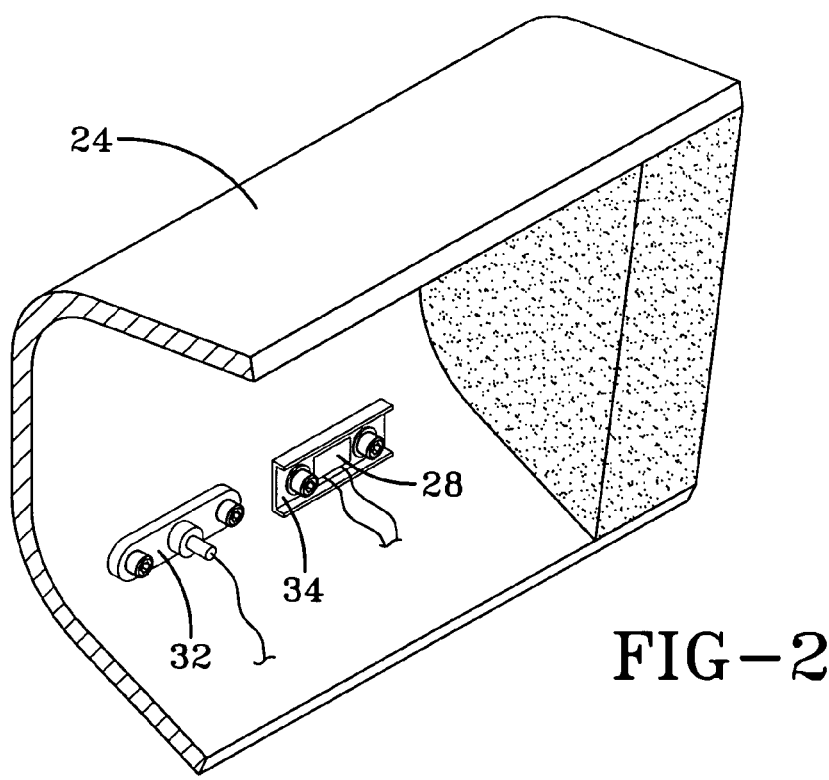
FIG. 2 is an enlarged view of a portion of the bumper of the automobile of FIG. 1 illustrating the mounting position of a piezo film sensor.

An alternative embodiment employs a Terfenol-D type sensing element 32 such as disclosed in U.S. Pat. No. 7,081,801, the disclosure of which is incorporated by reference herein. The Terfenol-D sensor 32 is a type of giant magnetostrictive sensing element with a composition of (Tb0.3 Dy0.7 Fe1.92). The Terfenol-D sensor 32 shown in FIG. 2 is located in substantially the same location on the bumper 24 as the piezo film sensor 28, or may be spaced on the bumper from the piezo film sensor 28. The Terfenol-D sensor 32 has a frequency response that is substantially opposite the frequency response of the piezo film sensor 28. As shown in FIG. 3, the Terfenol-D sensor 32 responds to the rubber hammer blow with resulting stress waves 33 producing an output signal of about 50 mV, but, as shown in FIG. 4, the Terfenol-D sensor responds to the ball-bearing hit and resulting stress waves 35 with an amplitude of over 1000 mV. Thus it can be concluded that the output of both sensors 28, 32 may be compared, so that when the amplitude of the piezo film sensor 28 exceeds the amplitude of the Terfenol-D sensor 32 the automobile could be concluded to be impacting a soft body such as a pedestrian or an animal. In contrast, when the amplitude of the Terfenol-D sensor 32 is greater than the amplitude of the piezo film sensor 28, the automobile could be concluded to be impacting a rigid body. Again, the power spectral density function of the output of each sensor 28, 32 can be compared, or combined, and when frequencies below some cut off frequency, for example 1000 Hz or 2000 Hz, have a greater power density than the frequencies above the cut off frequency, then a soft body impact is taking place. When the situation is reversed a collision with a rigid body is taking place.

The output of the piezo film sensor 28 or the piezo film sensor and the Terfenol-D sensor 32, can also be combined with the output of acceleration sensors mounted to the automobile as part of an overall crash detection system. The output of the acceleration sensors can provide a rough indication of the mass of the object with which the vehicle has collided. Thus the mass of the object, and the power spectral density, can be used to decide the type of object that has been struck. Other data available from the vehicle safety system or other vehicle sensors such as vehicle speed can also be combined, for example to differentiate between pedestrians which are typically struck at lower speeds, and animals which are typically struck at higher speeds.

The sensors 28, 32, which are mounted directly to the bumper 24, provide an early indication of the type of impact taking place, providing maximum time for deploying active systems, for example systems which elevate the automobile hood 25 either to prevent a pedestrian's head from impacting rigid components under the hood 25, or to allow the hood 25 to be raised sufficiently to prevent an animal with which the vehicle is colliding from breaking through the vehicle windshield 36.

Piezo fluoropolymer film sensors are known and are, for example, supplied by Measurement Specialties, Inc. The piezo film sensor might also be constructed from other film materials for example piezoelectric polymers that are known today include polyparaxylene, poly-bischloromethyuloxetane (Penton), aromatic polyamides, polysulfone, polyvinyl fluoride, synthetic polypeptide and cyanoethul cellulose. The film sensor 28 may be bonded to a rigid support 34, as shown in FIG. 2, which is riveted, screwed or bolted to the bumper 24 in a way similar to the Terfenol-D type sensor shown in commonly owned U.S. patent application Ser. No. 10/792,739. Alternatively, the piezo film sensor may be bonded directly to or formed with the bumper 24. Similarly, the Terfenol-D Type sensor may be mounted by screws, rivets or bolts to the bumper 24.

It is understood that the invention is not limited to the particular construction and arrangement of parts herein illustrated and described, but embraces all such modified forms thereof as come within the scope of the following claims.

I claim:

1. A vehicle soft impact detection system for differentiating between an automobile front bumper impact with a rigid object and a front bumper impact with a pedestrian or animal, the system comprising:
   a piezoelectric film sensor mounted to a front bumper in shock receiving relation;
   a giant magnetostrictive sensing element mounted to the front bumper in shock receiving relation; and
   a safety system in signal receiving relation to the piezoelectric film sensor, and to the giant magnetostrictive sensing element, the safety system in controlling relation to at least one device.

2. A method of differentiating an automobile front bumper impact with a pedestrian or animal from other types of impacts, comprising the steps of:
   upon impact with an object, receiving a first signal from a piezoelectric film sensor mounted to the front bumper in shock receiving relation;
   substantially simultaneously with receiving the first signal from the piezoelectric film sensor, receiving a second signal from a giant magnetostrictive sensing element which is mounted to the front bumper in shock receiving relation; and
   comparing the first signal with the second signal to determine if an impact with a pedestrian or animal has occurred.

3. The method of claim 2 wherein the step of comparing the first signal with the second signal to determine if an impact with a pedestrian or animal has occurred, comprises:
   determining from the first signal, a first amplitude at a frequency or range of frequencies below 1,000 Hz;
   determining from the second signal, a second amplitude at a frequency or range of frequencies above 10,000 Hz; and
   comparing the first amplitude with the second amplitude and determining if an impact with a pedestrian or animal has occurred.

4. The method of claim 2 wherein the step of comparing the first signal with the second signal comprises determining a ratio of relative signal strength, and comparing the first signal with at least two amplitude standards, and comparing the second signal with at least two amplitude standards.

5. A method of differentiating an automobile front bumper impact with a pedestrian or animal from other types of impacts, comprising the steps of:

upon impact with an object, receiving a first signal from a piezoelectric film sensor mounted to the front bumper in shock receiving relation;

substantially simultaneously with receiving the first signal from the piezoelectric film sensor, receiving a second signal from a second different type of sensor which is more responsive to high-frequency stress waves, where the second type of sensor is mounted to the front bumper in shock receiving relation;

comparing the first signal with the second signal to determine if an impact with a pedestrian or animal or another type of impact has occurred.

6. The method of claim 5 wherein the second different type of sensor is a giant magnetostrictive sensing element which is mounted in shock receiving relation to the front bumper.

7. The method of claim 5 wherein the step of comparing the first signal with the second signal to determine if an impact with a pedestrian or animal has occurred, comprises:

determining from the first signal, a first amplitude at a frequency or range of frequencies below $1,000_{13}$ Hz;

determining from the second signal, a second amplitude at a frequency or range of frequencies above 10,000 Hz; and comparing the first amplitude with the second amplitude, and determining if an impact with a pedestrian or animal has occurred.

8. The method of claim 5 wherein the step of comparing the first signal with the second signal includes determining a ratio of relative signal strength, and comparing the first signal with at least two amplitude standards, and comparing the second signal with at least two amplitude standards.

* * * * *